US012607573B2

(12) United States Patent
Kim et al.

(10) Patent No.: US 12,607,573 B2
(45) Date of Patent: Apr. 21, 2026

(54) DEFECT INSPECTION DEVICE AND DEFECT INSPECTION METHOD

(71) Applicant: Samsung Electronics Co., Ltd., Suwon-si (KR)

(72) Inventors: Minsu Kim, Suwon-si (KR); Seungryeol Oh, Suwon-si (KR); Jeongho Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 18/411,816

(22) Filed: Jan. 12, 2024

(65) Prior Publication Data

US 2024/0272089 A1 Aug. 15, 2024

(30) Foreign Application Priority Data

Feb. 15, 2023 (KR) ........................ 10-2023-0020125

(51) Int. Cl.
*G01N 21/956* (2006.01)
*G01J 1/02* (2006.01)
(Continued)

(52) U.S. Cl.
CPC .......... *G01N 21/956* (2013.01); *G01J 1/0228* (2013.01); *G01J 1/0407* (2013.01); *G01N 21/255* (2013.01); *G01N 21/8806* (2013.01); *G01N 21/9501* (2013.01); *G01N 2021/555* (2013.01); *G01N 2021/8809* (2013.01); *G01N 2021/8835* (2013.01); *G01N 2021/9513* (2013.01); *G01N 2201/068* (2013.01); *G01N 2201/127* (2013.01)

(58) Field of Classification Search
CPC .............. G01N 21/956; G01N 21/255; G01N 21/8806; G01N 21/9501; G01N 2021/555; G01N 2021/8809; G01N 2021/8835; G01N 2021/9513; G01N 2201/068; G01N 2201/127; G01J 1/0228; G01J 1/0407
See application file for complete search history.

(56) References Cited

U.S. PATENT DOCUMENTS 5,355,212 A * 10/1994 Wells ..................... G01N 21/94
356/394
8,384,887 B2 2/2013 Lange et al.
(Continued)

FOREIGN PATENT DOCUMENTS

JP 2007-114087 A 5/2007
JP 2010-236966 A 10/2010
(Continued)

*Primary Examiner* — Dominic J Bologna
(74) *Attorney, Agent, or Firm* — Muir Patent Law, PLLC

(57) ABSTRACT

A defect inspection device includes a stage on which a substrate is provided, an objective lens disposed above the stage to project light onto the substrate, a light source configured to emit light onto a main surface of the substrate via the objective lens, a light quantity measurement sensor disposed above the stage and configured to measure an amount of the light that is reflected from a first region of the main surface of the substrate, a light quantity regulator located between the light source and the objective lens and configured to regulate an amount of the light that is emitted from the light source onto the main surface of the substrate.

19 Claims, 14 Drawing Sheets

(51) Int. Cl.

| | |
|---|---|
| *G01J 1/04* | (2006.01) |
| *G01N 21/25* | (2006.01) |
| *G01N 21/55* | (2014.01) |
| *G01N 21/88* | (2006.01) |
| *G01N 21/95* | (2006.01) |

(56) References Cited

U.S. PATENT DOCUMENTS

| | | | |
|---|---|---|---|
| 9,036,143 | B2 | 5/2015 | Yamashita et al. |
| 9,204,105 | B2 | 12/2015 | Fujimoto et al. |
| 9,355,208 | B2 | 5/2016 | Shifrin et al. |
| 2002/0154303 | A1* | 10/2002 | Maeda ............. G01N 21/95607 356/394 |
| 2003/0210391 | A1* | 11/2003 | Uto ........................ G01N 21/94 356/237.1 |
| 2005/0024630 | A1* | 2/2005 | Ohno ................. G01N 21/9503 356/237.1 |
| 2006/0066842 | A1* | 3/2006 | Saunders ............. G01N 21/956 356/237.1 |
| 2007/0195316 | A1* | 8/2007 | Yoshida ............. G01N 21/8806 356/237.5 |
| 2010/0245811 | A1 | 9/2010 | Yoshikawa |
| 2012/0133928 | A1* | 5/2012 | Urano ................ G01N 21/9501 356/237.2 |
| 2018/0073992 | A1* | 3/2018 | Van Voorst ........... G03F 7/7065 |
| 2021/0366143 | A1* | 11/2021 | Vaez-Iravani ............. G06T 7/68 |

FOREIGN PATENT DOCUMENTS

| | | |
|---|---|---|
| JP | 2013-228361 A | 11/2013 |
| JP | 2014-209075 A | 11/2014 |
| JP | 6086311 B2 | 3/2017 |
| KR | 10-0460641 B1 | 12/2004 |
| KR | 10-2010-0110321 A | 10/2010 |
| WO | 2007-092950 A2 | 8/2007 |

* cited by examiner

FIG. 4

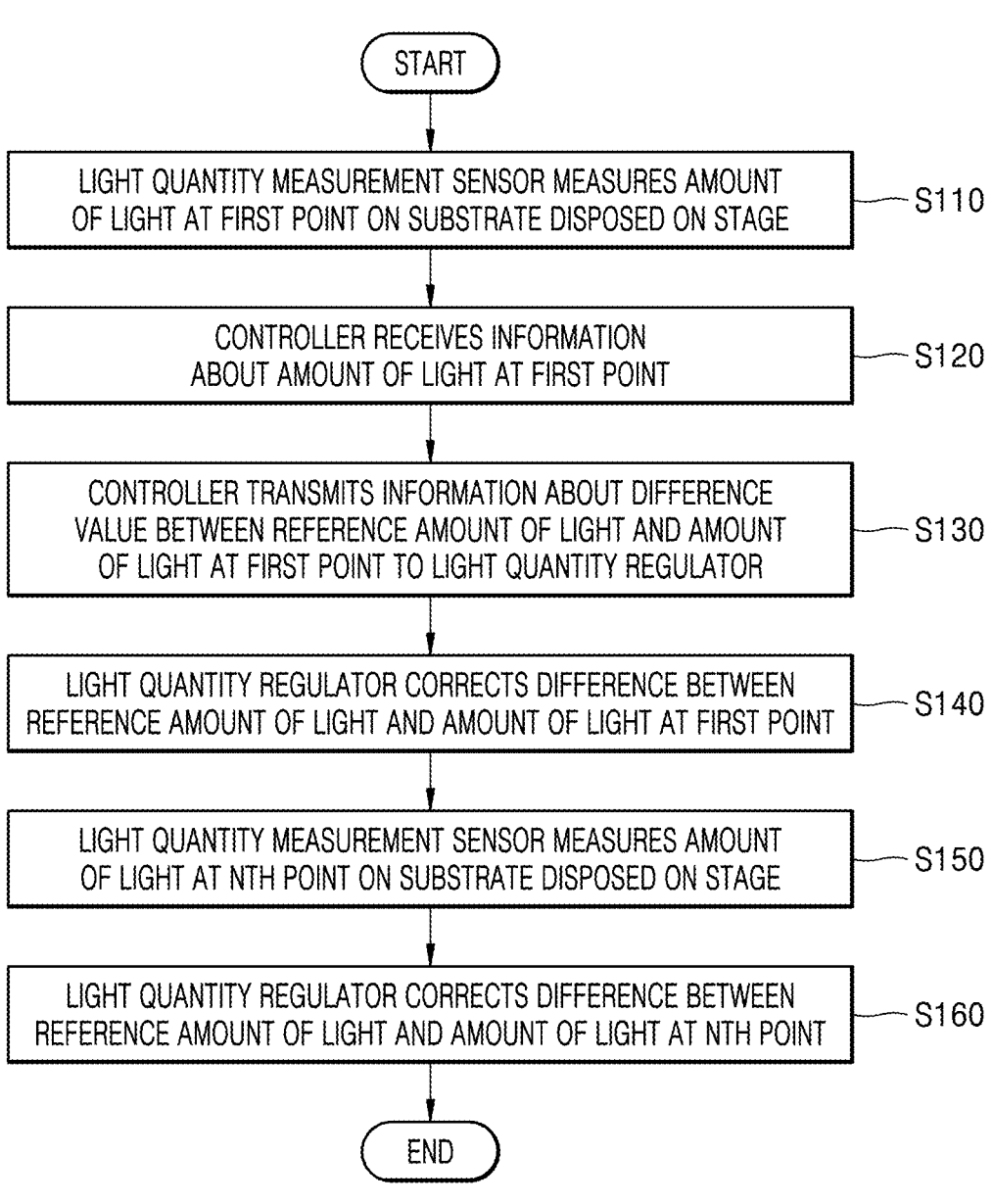

START

LIGHT QUANTITY MEASUREMENT SENSOR MEASURES AMOUNT OF LIGHT AT FIRST POINT ON SUBSTRATE DISPOSED ON STAGE — S110

CONTROLLER RECEIVES INFORMATION ABOUT AMOUNT OF LIGHT AT FIRST POINT — S120

CONTROLLER TRANSMITS INFORMATION ABOUT DIFFERENCE VALUE BETWEEN REFERENCE AMOUNT OF LIGHT AND AMOUNT OF LIGHT AT FIRST POINT TO LIGHT QUANTITY REGULATOR — S130

LIGHT QUANTITY REGULATOR CORRECTS DIFFERENCE BETWEEN REFERENCE AMOUNT OF LIGHT AND AMOUNT OF LIGHT AT FIRST POINT — S140

LIGHT QUANTITY MEASUREMENT SENSOR MEASURES AMOUNT OF LIGHT AT NTH POINT ON SUBSTRATE DISPOSED ON STAGE — S150

LIGHT QUANTITY REGULATOR CORRECTS DIFFERENCE BETWEEN REFERENCE AMOUNT OF LIGHT AND AMOUNT OF LIGHT AT NTH POINT — S160

END

FIG. 14
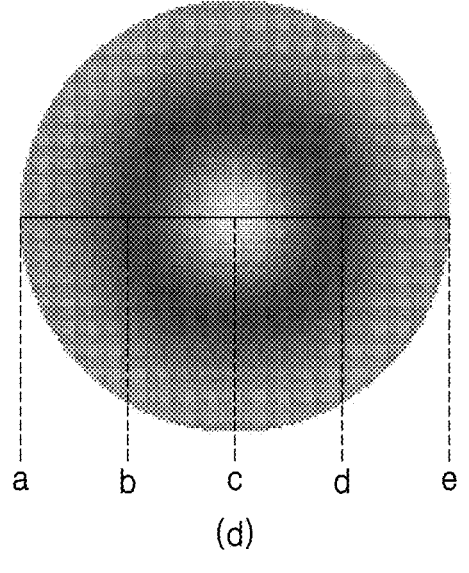
(d)
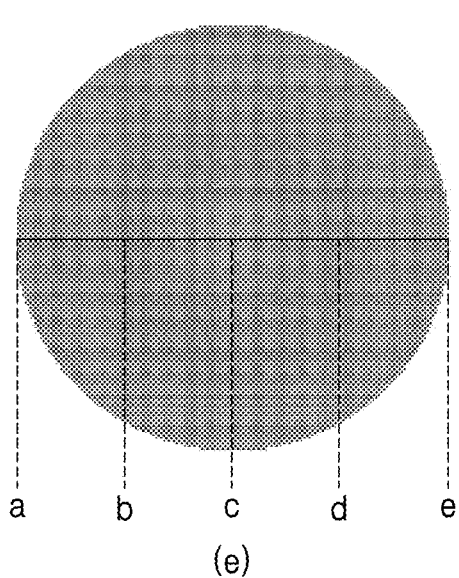
(e)

DEFECT INSPECTION DEVICE AND DEFECT INSPECTION METHOD

CROSS-REFERENCE TO RELATED APPLICATION

This application is based on and claims priority under 35 U.S.C. § 119 to Korean Patent Application No. 10-2023-0020125, filed on Feb. 15, 2023, in the Korean Intellectual Property Office, the disclosure of which is incorporated by reference herein in its entirety.

BACKGROUND

Aspects of the inventive concept relate to a defect inspection device and a defect inspection method.

As semiconductor devices are highly integrated and have high capacities, design rules thereof are gradually reduced and the widths of patterns constituting the semiconductor devices are getting smaller and smaller. As the patterns constituting the semiconductor devices become increasingly fine, defect inspection devices and defect inspection methods for more precisely inspecting substrates having the semiconductor devices are required.

SUMMARY

Aspects of inventive concept provide a defect inspection device and a defect inspection method, capable of precisely measuring defects on a substrate by correcting the amount of light provided to the substrate.

According to an aspect of the inventive concept, there is provided a defect inspection device including a stage on which a substrate is provided, an objective lens disposed above the stage to project light onto the substrate, a light source configured to emit light onto a main surface of the substrate via the objective lens, a light quantity measurement sensor disposed above the stage and configured to measure an amount of the light that is reflected from a first region of the main surface of the substrate, a light quantity regulator located between the light source and the objective lens and configured to regulate an amount of the light that is emitted from the light source onto the main surface of the substrate, and a controller configured to control the light quantity regulator so that the light quantity regulator regulates the amount of the light emitted to the first region on the basis of information about the amount of the light reflected from the first region measured by the light quantity measurement sensor.

According to another aspect of the inventive concept, there is provided a defect inspection method including emitting, by a light source, light onto a substrate disposed on a stage via an objective lens, measuring, by a light quantity measurement sensor, an amount of the light reflected from a first region of a main surface of the substrate, receiving, by a controller, information about the amount of the light measured by the light quantity measurement sensor, calculating, by the controller, a difference value between the amount of the light that is measured by the light quantity measurement sensor and a reference amount of light that is preset and then transmitting the difference value to a light quantity regulator, and correcting, by the light quantity regulator, an amount of light emitted to the first region based on the difference value.

According to another aspect of the inventive concept, there is provided a defect inspection device including a stage on which a substrate is provided, an objective lens disposed above the stage to project light onto the substrate, a light source configured to provide light onto a main surface of the substrate via the objective lens, a light quantity measurement sensor disposed above the stage and configured to measure an amount of the light that is reflected from a first region of the main surface of the substrate, a light quantity regulator located between the light source and the objective lens and configured to regulate an amount of the light that is emitted from the light source onto the main surface of the substrate, a controller configured to control the light quantity regulator so that the light quantity regulator regulates the amount of the light provided to the first region on the basis of information about the amount of the light reflected from the first region measured by the light quantity measurement sensor, and an image sensor configured to capture an image of the light reflected from the main surface of the substrate, wherein the controller controls the light quantity regulator so that the amount of the light emitted to the first region decreases when the amount of the light in the first region measured by the light quantity measurement sensor is greater than a reference amount of light that is preset and the amount of the light emitted to the first region increases when the amount of the light in first region measured by the light quantity measurement sensor is less than the reference amount of light that is preset.

BRIEF DESCRIPTION OF THE DRAWINGS

Embodiments will be more clearly understood from the following detailed description taken in conjunction with the accompanying drawings in which:

FIG. 4 is a flowchart showing a sequence of a defect inspection method according to an embodiment;

FIG. 14 is a view showing the effects of the defect inspection device and the defect inspection method according to an embodiment.

DETAILED DESCRIPTION OF THE EMBODIMENTS

Hereinafter, embodiments are described in detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of aspects of the inventive concept to those skilled in the art.

Figure 1:
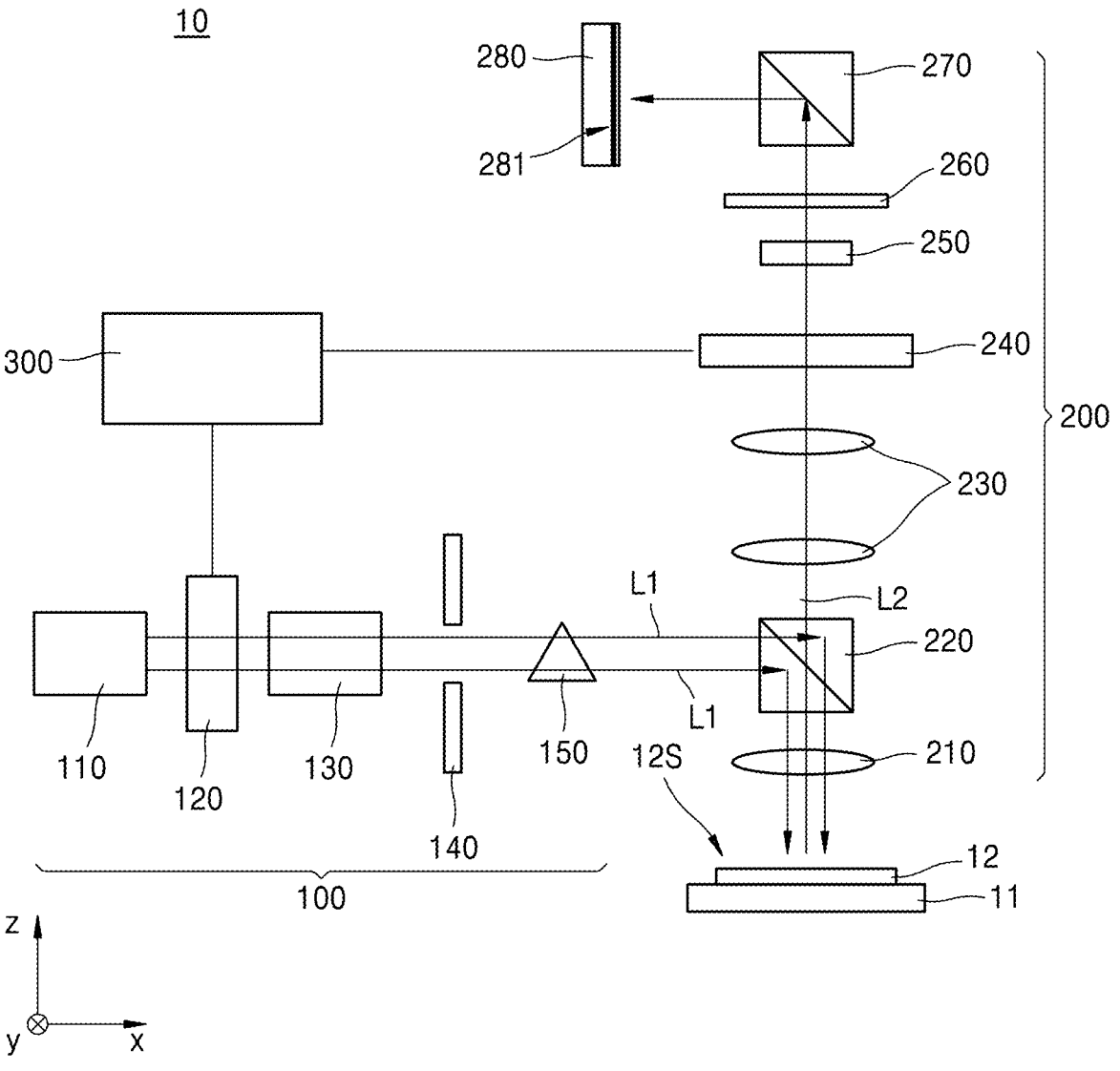
FIG. 1 is a schematic view showing a defect inspection device according to an embodiment.

FIG. 1 is a schematic view showing a defect inspection device 10 according to an embodiment. The defect inspection device 10 illustrated in FIG. 1 is for capturing an image of a sample on a substrate 12 and may be used, for example, as a component of an optical semiconductor inspection apparatus. The sample is not illustrated as being disposed on a main surface 12S of the substrate 12, but hereinafter, detecting the light reflected from the main surface 12S of the substrate 12 (or simply the substrate 12) may represent detecting the light reflected from the sample disposed on the substrate 12.

Referring to FIG. 1, a first horizontal direction (X direction) and a second horizontal direction (Y direction) may be directions that cross each other among horizontal directions. For example, the first horizontal direction (X direction) and the second horizontal direction (Y direction) may perpendicularly cross each other. The vertical direction (Z direction) may cross both the first horizontal direction (X direction) and the second horizontal direction (Y direction). For example, the vertical direction (Z direction) may be perpendicular to both the first horizontal direction (X direction) and the second horizontal direction (Y direction). Accordingly, the first horizontal direction (X direction), the second horizontal direction (Y direction), and the vertical direction (Z direction) may be orthogonal to each other. The vertical direction (Z direction) may be perpendicular to the upper surface of the substrate 12 mounted on the stage 11.

The defect inspection device 10 may include an illumination optical system 100 and an imaging optical system 200. The illumination optical system 100 may include a light source 110, a light quantity regulator 120, a color filter 130, an illumination aperture 140, and an illumination polarizer 150. In the illumination optical system 100, light output from the light source 110 may be emitted onto the sample disposed on the main surface 12S of the substrate 12 via an objective lens 210. Also, the imaging optical system 200 may include a first light splitter 220, relay lenses 230, a light quantity measurement sensor 240, an imaging polarizer 250, an imaging aperture 260, a second light splitter 270, and an image sensor 280. The imaging optical system 200 may form an image on an image capturing surface 281 of the image sensor 280 using light which is collected by the objective lens 210 and reflected from the sample on the substrate 12.

According to an embodiment, the stage 11 may accommodate the substrate 12. A stage controller (not shown) may control the stage 11 and move the substrate 12. During a process of inspecting a defect on the substrate 12, the stage 11 may move in the first horizontal direction (X direction) or the second horizontal direction (Y direction) parallel to the upper surface of the substrate 12.

According to an embodiment, the objective lens 210 may be disposed above the stage 11. The objective lens 210 may magnify an image of the substrate 12 and project the same onto the image capturing surface 281 of the image sensor 280. For example, the objective lens 210 may have a numerical aperture (NA) of about 0.92.

The light source 110 of the illumination optical system 100 may be located on one side of the objective lens 210. The light source 110 may generate light that is to be provided toward the main surface 12S of the substrate 12. The main surface 12S may represent an upper surface of the substrate 12 disposed on the stage 11. For example, the light source 110 may include a xenon plasma lamp or an ultraviolet laser generator. The light quantity regulator 120 may be configured to receive a signal transmitted from a controller 300 and regulate the amount of light generated from the light source 110. Specifically, the light quantity regulator 120 may individually and differently control the amount of light emitted to several regions of the main surface 12S of the substrate 12, and thus, the amount of light reflected from the sample disposed on the substrate 12 may become uniform. The operation principle of the light quantity regulator 120 is described below in detail.

The color filter 130 may be located in front of the light quantity regulator 120. The color filter 130 may transmit light of a specific wavelength band in the light passing through the light quantity regulator 120 and emit the same forward. The color filter 130 may include a filter that transmits and emits only light having a specific wavelength in a wavelength range of about 380 to about 780, for example, red light having a wavelength close to 650 nm or violet light having a wavelength close to 430 nm. As used herein, the term "in front of" in relation to one or more components of the defect inspection device 10 refers to a position along the optical path of the light emitted by the light source 110 (i.e., path of light) after the light passes through the one or more components.

The illumination aperture 140 may be located in front of the color filter 130. The illumination aperture 140 may define the beam size of light emitted from the light source 110. The illumination polarizer 150 may be located in front of the illumination aperture 140. The illumination polarizer 150 may polarize light emitted from the light source 110. The light emitted from the light source 110 may be linearly or elliptically polarized through the illumination polarizer 150.

According to an embodiment, the image sensor 280 may be disposed above (e.g., along the Z direction) the objective lens 210. The image sensor 280 may be located overlapping a path of light so as to receive light reflected from the main surface 12S of the substrate 12. FIG. 1 illustrates that the path of light reflected from the main surface 12S of the substrate 12 extends in the vertical direction (Z direction). The image sensor 280 may detect an image of the substrate 12 using the light reflected from the substrate 12. The image sensor 280 may include a charge-coupled device (CCD) or a complementary metal oxide semiconductor (CMOS) image sensor. Although not illustrated, the image sensor 280 may have a plurality of pixels arranged in the form of a matrix. A resolved distance of the image sensor 280 may be inversely proportional to the numerical aperture (NA) of the objective lens 210 and may be proportional to the wavelength of light reflected from the main surface 12S of the substrate 12 (for example, $R=K\lambda/NA$, where R is the resolved distance of the image sensor 280, $K=0.5$, and NA is the numerical aperture of the objective lens 210). When the light reflected from the main surface 12S of the substrate 12 has a wavelength ($\lambda$) of about 200 nm and the objective lens 210 has a numerical aperture (NA) of about 0.92, the image sensor 280 may have a resolved distance capable of distinguishing between images having a width of about 108 nm or more. In addition, the sensitivity of the image sensor 280 may be the same as an incident angle of light that is incident on the substrate 12 through the objective lens 210 (for example, $NA=n \sin \theta$, where NA is the numerical aperture of the objective lens 210, n is the refractive index of air ($n=1$), and $\theta$ is the incident angle of light). When the numerical aperture (NA) of the objective lens 210 is 0.92, each of the sensitivity of the image sensor 280 and the incident angle ($\theta$) of the light incident on the substrate 12 may be 66.66.

According to an embodiment, the imaging optical system 200 may be disposed above the objective lens 210. Here, 'imaging' of the imaging optical system 200 is a term used to distinguish from 'illumination' of the illumination optical system 100 and may be understood and/or interpreted as a system on an imaging side. Relay lenses 230 of the imaging optical system 200 may adjust the distance between the objective lens 210 and the imaging polarizer 250. The imaging polarizer 250 may be located between the relay lenses 230 and the image sensor 280 and polarize light reflected from the main surface 12S of the substrate 12. Here, the light reflected from the main surface 12S of the substrate 12 may be linearly or elliptically polarized.

According to an embodiment, the imaging aperture 260 may be located between the imaging polarizer 250 and the image sensor 280. The light reflected from the main surface 12S of the substrate 12 may pass through the imaging aperture 260. The imaging aperture 260 may define the beam size of light reflected from the main surface 12S of the substrate 12.

According to an embodiment, the light quantity measurement sensor 240 may be located between the relay lenses 230 and the imaging polarizer 250. The light quantity measurement sensor 240 may be disposed above the stage 11 and configured to measure the amount of light reflected from a plurality of regions of the main surface 12S of the substrate 12. The operation principle of the light quantity measurement sensor 240 is described below in detail. The light quantity measurement sensor 240 may utilize a photoelectric tube using an external photoelectric effect, a photomultiplier tube, a photoconductive sensor using an internal photoelectric effect, a PN photodiode, a PIN diode, an avalanche photodiode, a phototransistor, a PSD, an ion chamber using a photoionization effect, a proportional counter, or the like, but the embodiment is not necessarily limited to the sensors listed above.

According to an embodiment, the controller 300 may control the light quantity regulator 120 so that the light quantity regulator 120 regulates the amount of light on the basis of information about the amount of light that is reflected from each of the plurality of regions of the main surface 12S of the substrate 12 measured by the light quantity measurement sensor 240. This is described below in detail.

Briefly describing the operation principle of the defect inspection device 10 according to an embodiment, first light L1 initially and primarily emitted from the light source 110 is reflected by the first light splitter 220, collected by the objective lens 210, and then emitted onto the main surface 12S of the substrate 12. Subsequently, the first light L1 reflected from one of the plurality of regions of the main surface 12S of the substrate 12 arrives at the light quantity measurement sensor 240 via the objective lens 210 as second light L2. The second light L2 is light reflected from the one of the plurality of regions of the main surface 12S of the substrate 12 as a result of the first light L1 being incident upon the one of the plurality of regions of the main surface 12S of the substrate 12. On the basis of the information about the amount of the second light L2 measured by the light quantity measurement sensor 240, the controller 300 may control the light quantity regulator 120 so that the light quantity regulator 120 regulates the amount of first light L1 to thereby regulate (i.e., adjust) the second light L2.

Figure 2:
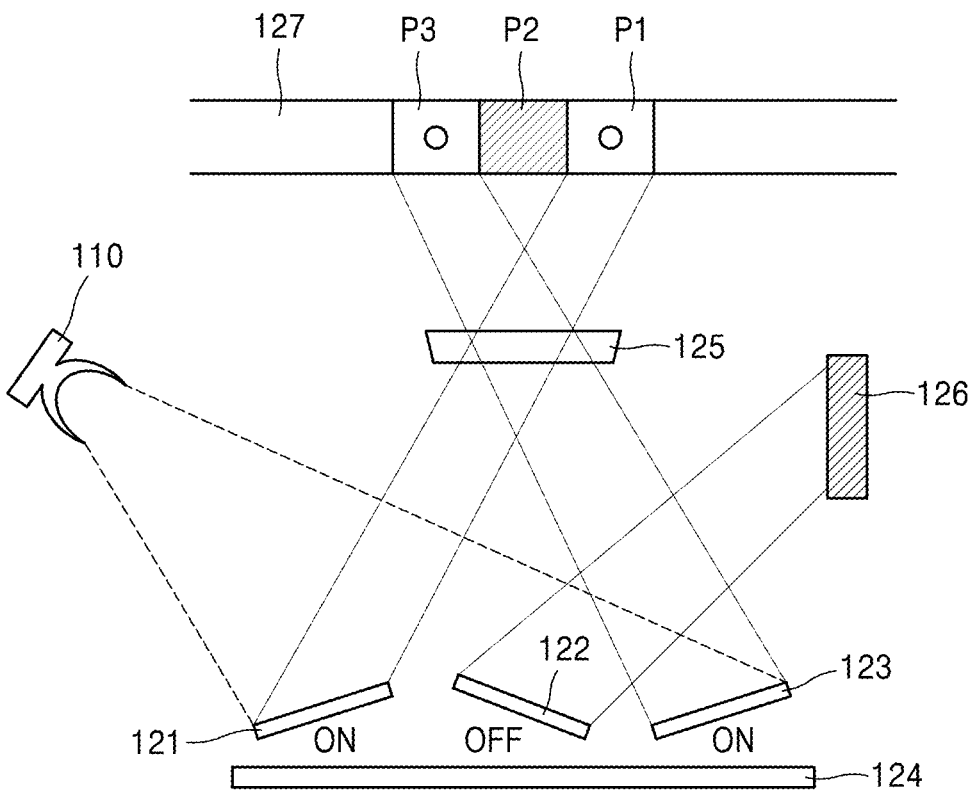
FIGS. 2 and 3 are views showing the principle that a light quantity regulator illustrated in FIG. 1 regulates light provided from a light source.
Figure 3:
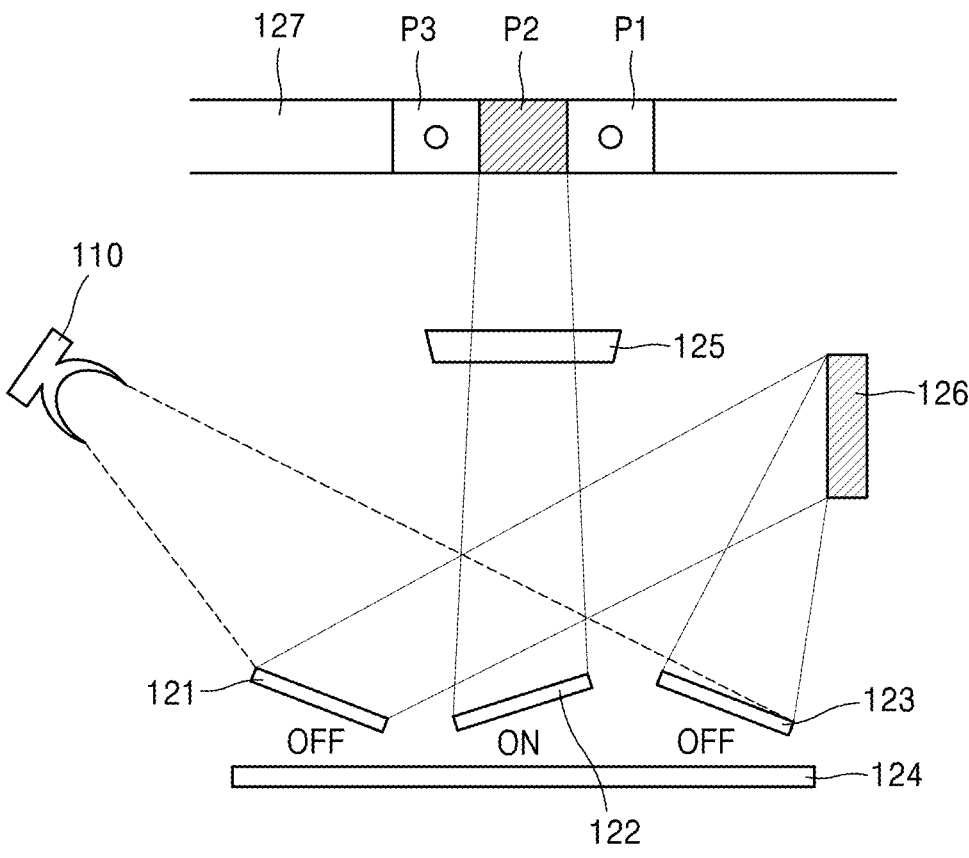

FIGS. 2 and 3 are views showing the principle that the light quantity regulator 120 illustrated in FIG. 1 regulates light provided from the light source 110. The light quantity regulator 120 may include any means capable of rapidly regulating the amount of light, such as a digital micromirror device (DMD) or a liquid crystal filter. Accordingly, the light quantity regulator 120 may include the DMD or the liquid crystal filter, but the embodiment is not necessarily limited thereto. However, for convenience of explanation of the principle of the light quantity regulator 120, the operation principle is described in detail when the light quantity regulator 120 includes a DMD. A description is given below with reference to FIGS. 2 and 3.

As illustrated in FIGS. 2 and 3, the light quantity regulator 120 includes a first mirror 121, a second mirror 122, and a third mirror 123. The first mirror 121, the second mirror 122, and the third mirror 123 may be arranged side by side on a flat plate 124 of the light quantity regulator 120. Although the drawings illustrate three mirrors included in the light quantity regulator 120, the light quantity regulator 120 may further include many other mirrors.

A screen 127 includes a first screen region P1, a second screen region P2, and a third screen region P3. Also, the first screen region P1 is a region on the screen corresponding to the first mirror 121, the second screen region P2 is a region on the screen corresponding to the second mirror 122, and the third screen region P3 is a region on the screen corresponding to the third mirror 123.

A lens 125 collects light between the screen 127 and the flat plate 124 of the light quantity regulator 120. As illustrated in FIGS. 2 and 3, the light source 110 emits light, and the light emitted from the light source 110 is emitted to the first to third mirrors 121, 122, and 123 above the flat plate 124.

In addition, it may be seen that the light reflected from mirrors in ON-states among the mirrors included in the light quantity regulator 120 is projected onto the screen 127. Specifically, as illustrated in FIG. 2, it may be seen that the light reflected from the first mirror 121 is projected onto the first screen region P1 of the screen 127 because the first mirror 121 is in an ON-state. Also, it may be seen that the light reflected from the second mirror 122 is projected onto a light absorber 126 because the second mirror 122 is in an OFF-state. Also, it may be seen that the light reflected from the third mirror 123 is projected onto the third screen region P3 of the screen 127 because the third mirror 123 is in an ON-state. Accordingly, only the first screen region P1 and the third screen region P3 on the screen 127 are displayed bright, and the second screen region P2 is displayed dark.

On the other hand, referring to FIG. 3, it may be seen that the light reflected from the first mirror 121 is projected onto the light absorber 126 because the first mirror 121 is in an OFF-state. Also, it may be seen that the light reflected from the second mirror 122 is projected onto the second screen region P2 of the screen 127 because the second mirror 122 is in an ON-state. Also, it may be seen that the light reflected from the third mirror 123 is projected onto the light absorber 126 because the third mirror 123 is in an OFF-state. The controller 300 illustrated in FIG. 1 may control the ON/OFF states of the first to third mirrors 121, 122, and 123 included in the light quantity regulator 120 to regulate the amount of light that pass through the light quantity regulator 120.

FIG. 4 is a flowchart showing a sequence of a defect inspection method according to an embodiment. FIGS. 5 to 12 are views for describing a method of regulating the amount of light, according to an embodiment. For convenience of description, FIGS. 4 to 12 are described below with reference to FIG. 1 together.

Figure 5:
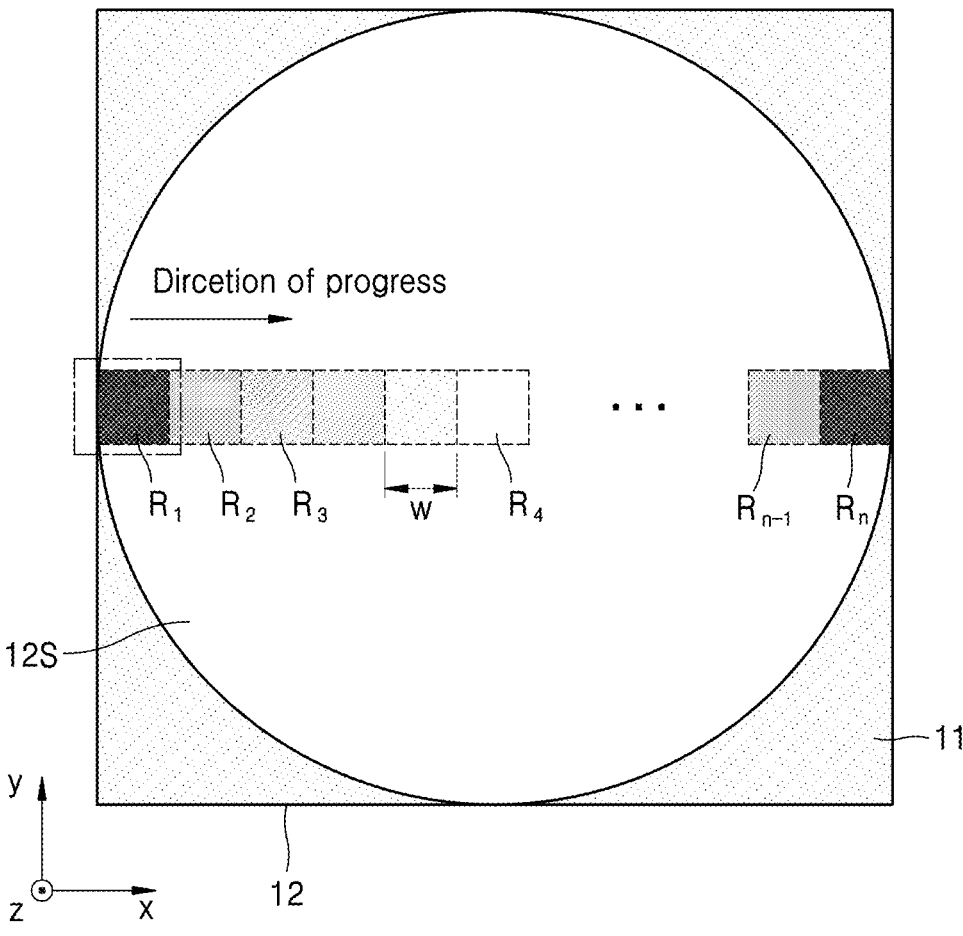
FIGS. 5 to 12 are views for describing a method of regulating the amount of light, according to an embodiment.

Referring to S110 of FIG. 4, the defect inspection method according to an embodiment may include an operation in which a light quantity measurement sensor 240 measures the amount of light that is primarily emitted to a first region $R_1$ of a substrate 12 disposed on a stage 11. As illustrated in FIG. 5, the light quantity measurement sensor 240 may measure the amount of light that is reflected from a main surface 12S of the substrate 12 disposed on the stage 11. FIG. 5 illustrates that measurement of the amount of light is performed by the light quantity measurement sensor 240 in a first horizontal direction (X direction), but the embodiment is not necessarily limited to this direction. The amounts of light reflected from the main surface 12S of the substrate 12 may differ depending on regions on the main surface 12S of the substrate 12. In FIG. 5, the amount of light reflected from the first region R₁ is the smallest (in comparison to the remaining regions), and thus, the first region R₁ is illustrated darkest.

Then, referring to S120 of FIG. 4, a controller 300 may receive information about the amount of light reflected from the first region R₁ of the main surface 12S of the substrate 12. The controller 300 may receive information indicating that the amount of light reflected from the first region R₁ is less than a reference amount of light that is preset. The light reflected from the first region R₁ described in S130 may correspond to the second light L2, which in turns corresponds to the first light L1 that is incident upon the main surface 12S of the substrate 12 in FIG. 1.

Next, referring to S130 of FIG. 4, the controller 300 may calculate a difference value between the amount of light reflected from the first region R₁ and the reference amount of light and then transmit the information about this difference value to the light quantity regulator 120. For example, when the amount of light in the first region R₁ measured by the light quantity measurement sensor 240 is less than the preset reference amount of light the controller 300 may control the light quantity regulator 120 so that the amount of light emitted (e.g., incident) to the first region R₁ is increased such that the amount of light reflected from the first region R₁ is increased as much as the difference value.

Figure 6:
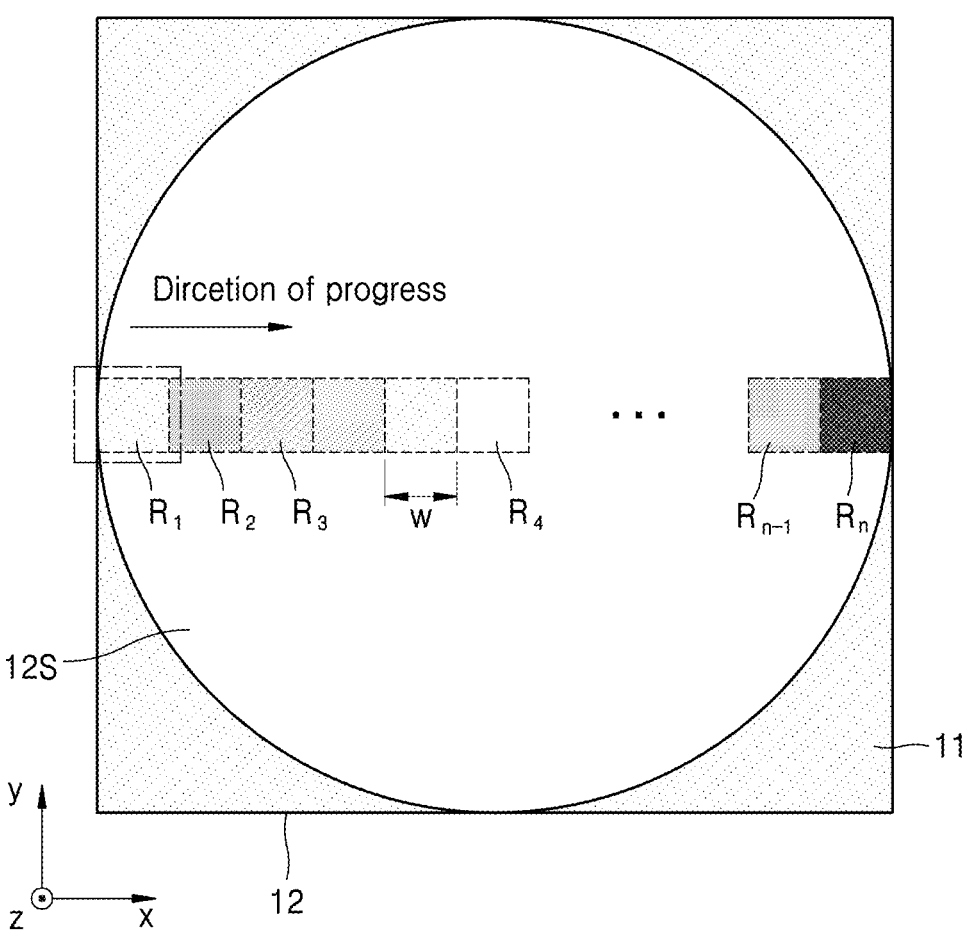

Next, referring to FIG. 6 together with S140 of FIG. 4, the light quantity regulator 120 may correct the difference between the amount of light in the first region R₁ and the reference amount of light. Specifically, the controller 300 controls the light quantity regulator 120 so that the amount of light (L1) emitted to the first region R₁ is increased such that the amount of light (L2) secondarily reflected from the first region R₁ is increased as much as the calculated difference value. Accordingly, the amount of light (L2) reflected from the first region R₁ measured again by the light quantity measurement sensor 240 may converge to the reference amount of light. In S140, the amount of light secondarily reflected from the first region R₁ may be corrected as much as the difference value between the reference amount of light and the amount of light reflected from the first region R₁. Here, the light secondarily reflected from the first region R₁ may correspond to the second light L2 secondarily reflected from the substrate 12 illustrated in FIG. 1.

Figure 7:
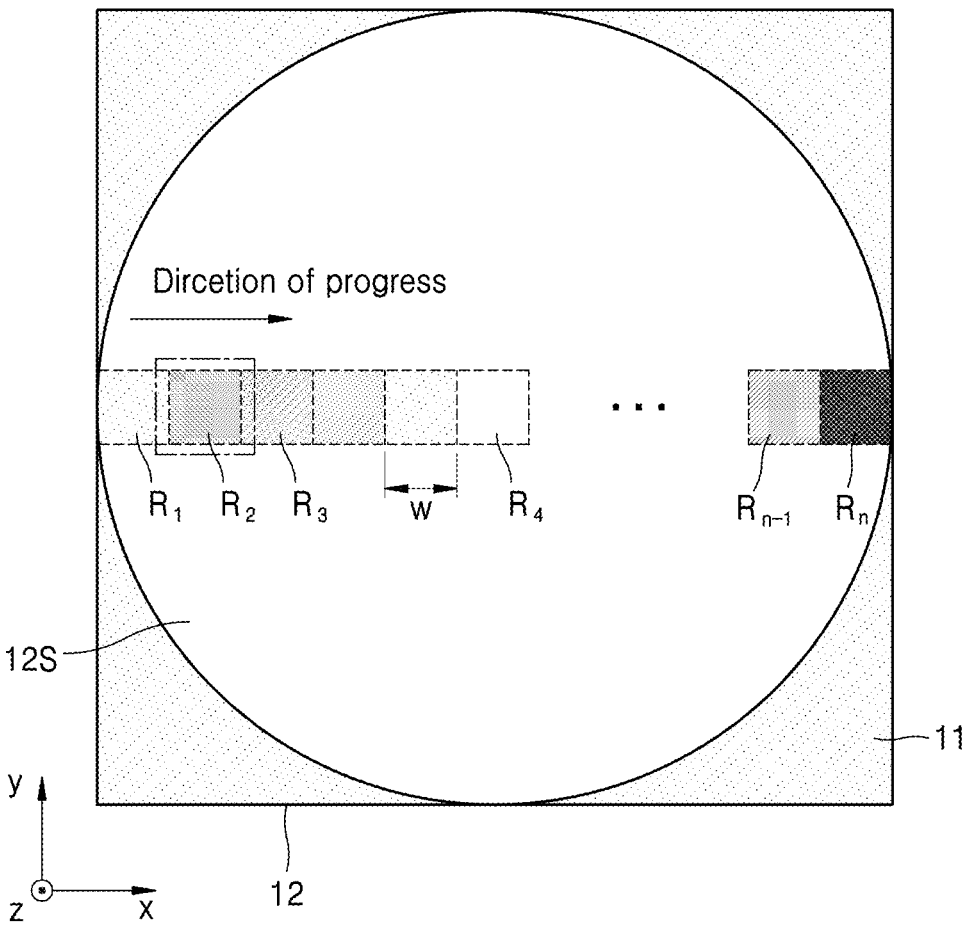

As illustrated in FIG. 7, after the light quantity regulator 120 has finished the regulation of the amount of light incident to the first region R₁, and thus the amount of light reflected from the first region R₁, the regulation of the amount of light incident to and reflected from a second region R₂ adjacent to the first region R₁ starts. The light source 110 may primarily emit light toward the second region R₂ of the main surface 12S of the substrate 12. As illustrated in FIG. 5, the second region R₂ is brighter than the first region R₁, but the second region R₂ is darker than the first region R₁ measured again in FIG. 7. That is, the amount of light reflected from the second region R₂ is less than the reference amount of light. The controller 300 may receive information about the amount of light reflected from the second region R₂ of the main surface 12S of the substrate 12. The controller 300 may receive information indicating that the amount of light reflected from the second region R₂ is less than a reference amount of light that is preset.

Next, the controller 300 may calculate a difference value between the amount of light reflected from the second region R₂ and the reference amount of light and then transmit the information about this difference value to the light quantity regulator 120. The amount of light in the second region R₂ measured by the light quantity measurement sensor 240 is less than the preset reference amount of light, and thus, the controller 300 may control the light quantity regulator 120 so that the amount of light emitted to the second region R₂ is increased such that the amount of light reflected from the second region R₂ is increased as much as the difference value.

Figure 8:
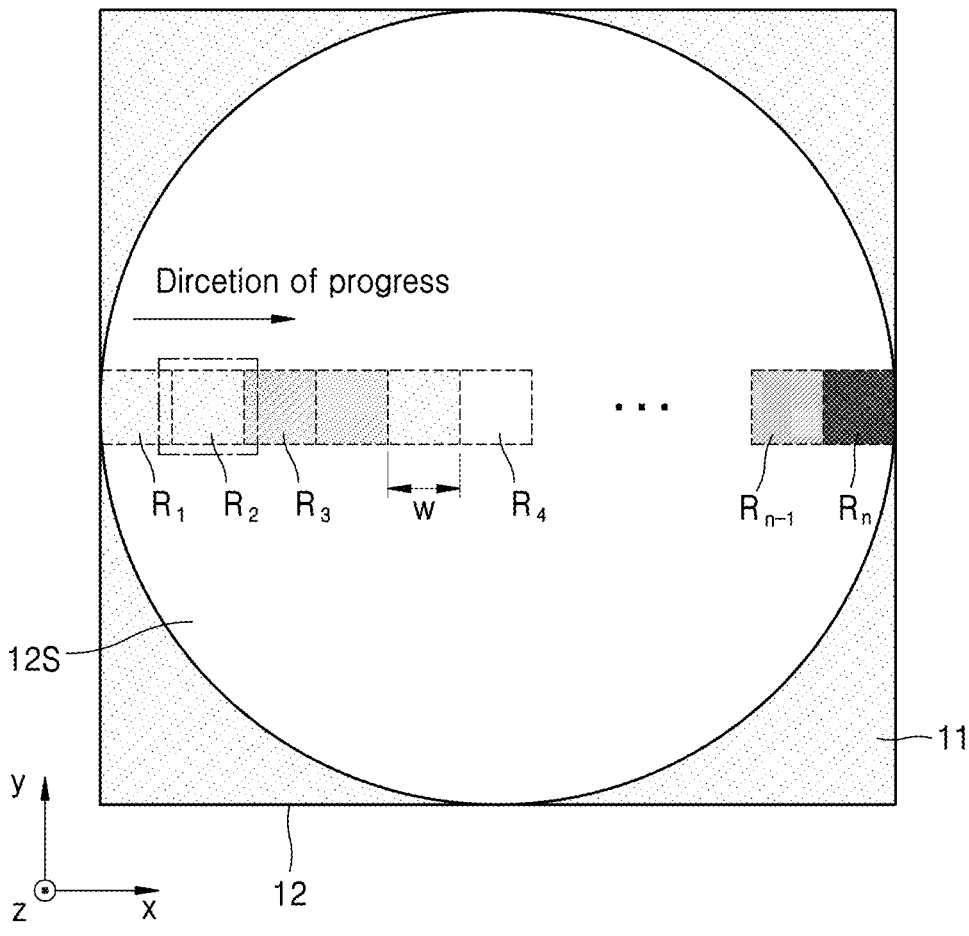

Next, referring to FIG. 8, the light quantity regulator 120 may correct the difference between the amount of light reflected from the second region R₂ and the reference amount of light. The controller 300 controls the light quantity regulator 120 so that the amount of light (L1) emitted to the second region R₂ is increased such that the amount of light (L2) secondarily reflected from the second region R₂ is increased as much as the difference value between the reference amount of light and the amount of light reflected from the second region R₂. Accordingly, the amount of light (L2) reflected from the second region R₂ measured again by the light quantity measurement sensor 240 may converge to the reference amount of light.

Figure 9:
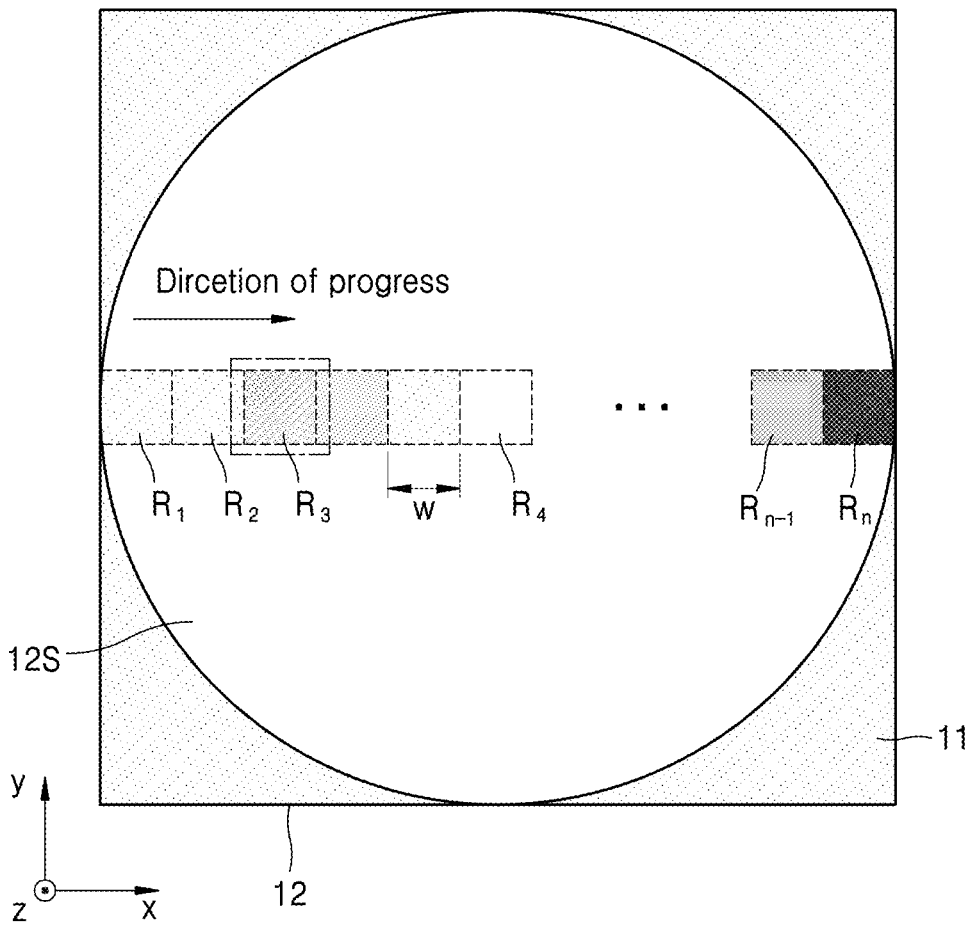

As illustrated in FIG. 9, after the light quantity regulator 120 has finished the regulation of the amount of light incident to the second region R₂, and thus the amount of light reflected from the second region R₂, the regulation of the amount of light incident to and reflected from a third region R₃ adjacent to the second region R₂ starts. The light source 110 may primarily emit light toward the third region R₃ of the main surface 12S of the substrate 12. As illustrated in FIG. 7, the third region R₃ is brighter than the second region R₂, but the third region R₃ is darker than the second region R₂ measured again in FIG. 8. That is, the amount of light reflected from the third region R₃ is less than the reference amount of light. The controller 300 may receive information about the amount of light reflected from the third region R₃ of the main surface 12S of the substrate 12. The controller 300 may receive information indicating that the amount of light reflected from the third region Ra is less than a reference amount of light that is preset.

Next, the controller 300 may calculate a difference value between the amount of light reflected from the third region R₃ and the reference amount of light and then transmit the information about this difference value to the light quantity regulator 120. The amount of light reflected from the third region R₃ measured by the light quantity measurement sensor 240 is less than the preset reference amount of light, and thus, the controller 300 may control the light quantity regulator 120 so that the amount of light emitted to the third region R₃ is increased such that the amount of light reflected from the third region R₃ is increased as much as the difference value.

Figure 10:
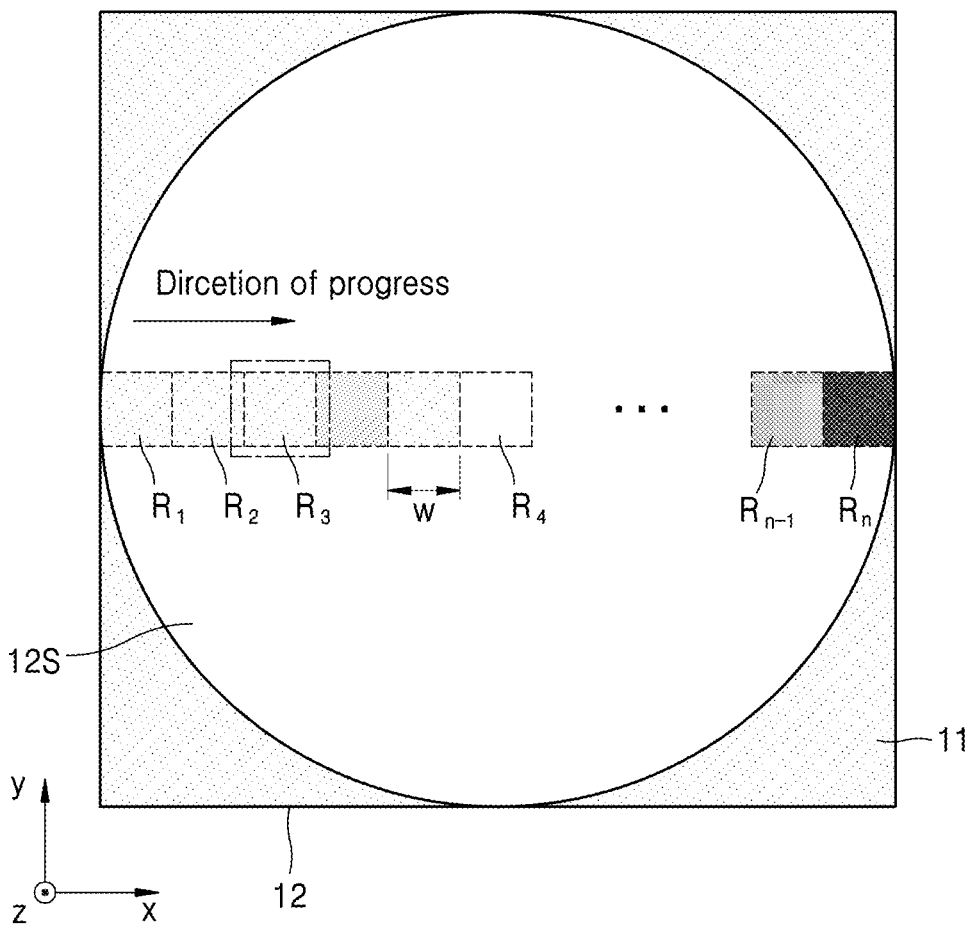

Next, referring to FIG. 10, the light quantity regulator 120 may correct the difference between the amount of light reflected from the third region R₃ and the reference amount of light. The controller 300 controls the light quantity regulator 120 so that the amount of light (L1) emitted to the third region R₃ is increased such that the amount of light (L2) reflected from the third region R₃ is increased as much as the difference value between the reference amount of light and the amount of light reflected from the third region R₃. Accordingly, the amount of light in the third region R₃ measured again by the light quantity measurement sensor 240 may converge to the reference amount of light.

Figure 11:
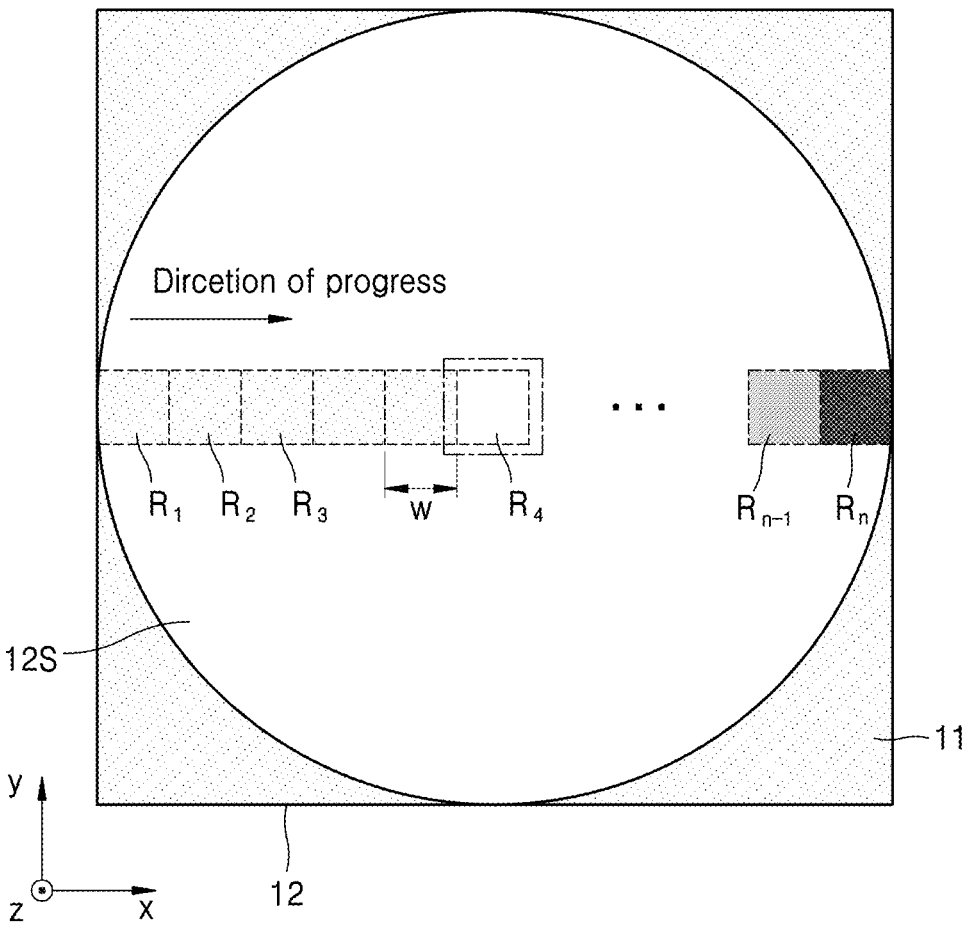

As illustrated in FIG. 11, after the light quantity regulator 120 has finished the regulation of the amount of light in the third region $R_3$, the regulation of the amounts of light in regions adjacent to the third region $R_3$ starts. Subsequently, the regulation of the amount of light in a fourth region $R_4$ starts. The light source 110 may primarily emit light toward the fourth region $R_4$ of the main surface 12S of the substrate 12. As illustrated in FIG. 11, the fourth region $R_4$ is brighter than the third region $R_3$. That is, the amount of light reflected from the fourth region $R_4$ is greater than a reference amount of light. The controller 300 may receive information about the amount of light reflected from the fourth region $R_4$ of the main surface 12S of the substrate 12. The controller 300 may receive information indicating that the amount of light reflected from the fourth region $R_4$ is greater than a reference amount of light that is preset.

Next, the controller 300 may calculate a difference value between the amount of light reflected from the fourth region $R_4$ and the reference amount of light and then transmit the information about this difference value to the light quantity regulator 120. The amount of light reflected from the fourth region $R_4$ measured by the light quantity measurement sensor 240 is greater than the preset reference amount of light, and thus, the controller 300 may control the light quantity regulator 120 so that the amount of light secondarily emitted to the fourth region $R_4$ is reduced as much as the difference value.

Figure 12:
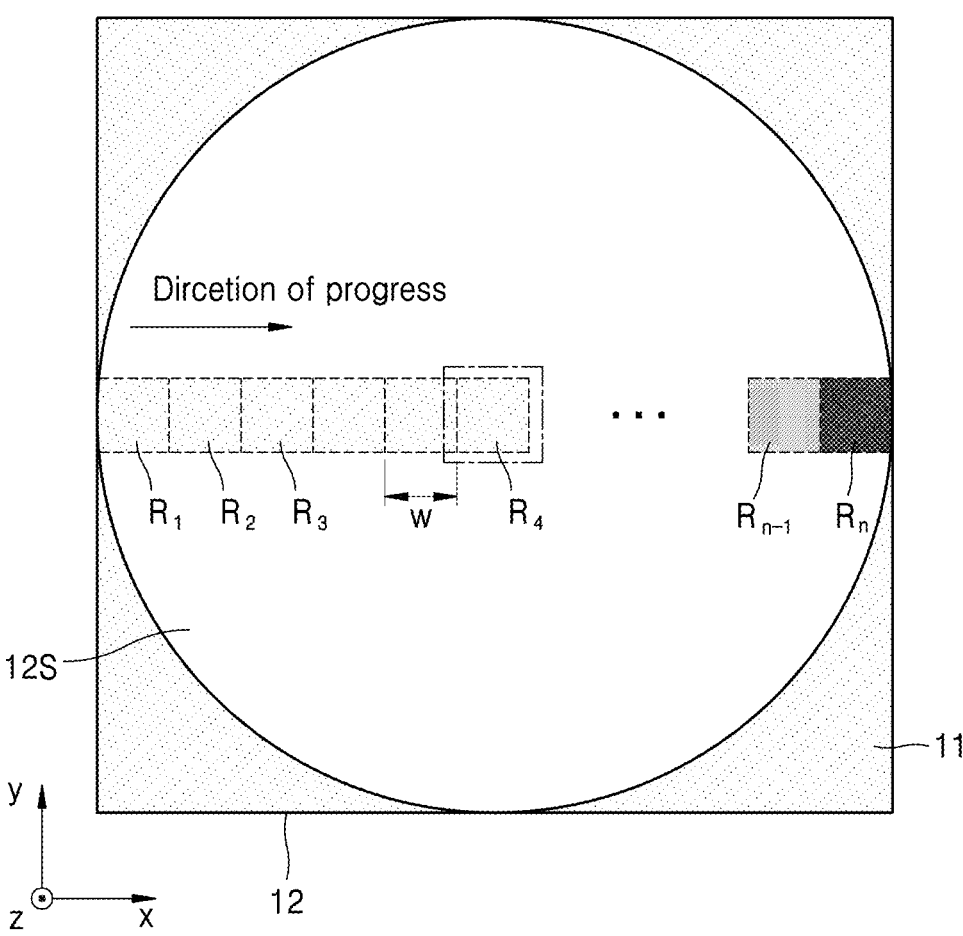

Next, referring to FIG. 12, the light quantity regulator 120 may correct the difference between the amount of light in the fourth region $R_4$ and the reference amount of light. The controller 300 controls the light quantity regulator 120 so that the amount of light emitted to the fourth region $R_4$ is reduced such that the amount of light reflected from the fourth region $R_4$ is reduced as much as the difference value between the reference amount of light and the amount of light reflected from the fourth region $R_4$. Accordingly, the amount of light in the fourth region $R_4$ measured again by the light quantity measurement sensor 240 may converge to the reference amount of light.

Referring back to S150 of FIG. 4, the defect inspection method according to an embodiment may include an operation in which the light quantity measurement sensor 240 measures the amount of light that is primarily emitted to an $n^{th}$ region $R_n$ of the substrate 12 disposed on the stage 11. Next, referring to S160, the defect inspection method may include an operation in which the light quantity regulator 120 corrects the difference between the amount of light in the $n^{th}$ region $R_n$ and a reference amount of light. Here, n is an integer of 2 or more. After the light quantity regulator 120 has finished the regulation of the amount of light emitted to the fourth region $R_4$ as illustrated in FIG. 12, the regulation of the amounts of light in an $n-1^{th}$ region $R_{n-1}$ and the $n^{th}$ region $R_n$ may start. The light source 110 may primarily emit light toward the $n-1^{th}$ region $R_{n-1}$ and the $n^{th}$ region $R_n$ of the main surface 12S of the substrate 12. FIG. 12 illustrates that n is at least 8, but n may be 2 or greater than 8 according to an embodiment. Here, as n increases, the regulation of the amount of light for inspecting defects of the substrate 12 may be precisely performed. However, many processes are repeated, and thus, it may take a long time to regulate the amount of light. On the other hand, as n decreases, it may take less time to perform the regulation of the amount of light for inspecting defects of the substrate 12. However, the regulation of the amount of light may be performed inaccurately.

In the defect inspection device 10 and the defect inspection method according to aspects of the inventive concept, the substrate 12 to be inspected may be divided into n regions. Also, as described above, the amount of light in one region among the n regions may be measured, and then, the amount of light in the one region may be regulated by comparison with the reference amount of light. Accordingly, the amounts of light in the n regions of the substrate 12 may be regulated differently, and all the amounts of light reflected from the n regions of the substrate 12 may converge to the preset reference amount of light. Therefore, the brightness of the substrate 12 inspected and measured by the defect inspection device 10 and the defect inspection method according to the inventive concept becomes uniform, and more precise defect inspection may be possible.

Also, in the defect inspection device 10 and the defect inspection method according to the inventive concept, the amounts of light in the n regions of the substrate 12 may be individually regulated in real time. Accordingly, it is possible to perform a rapid defect inspection compared to a defect inspection device according to the related art.

Figure 13:
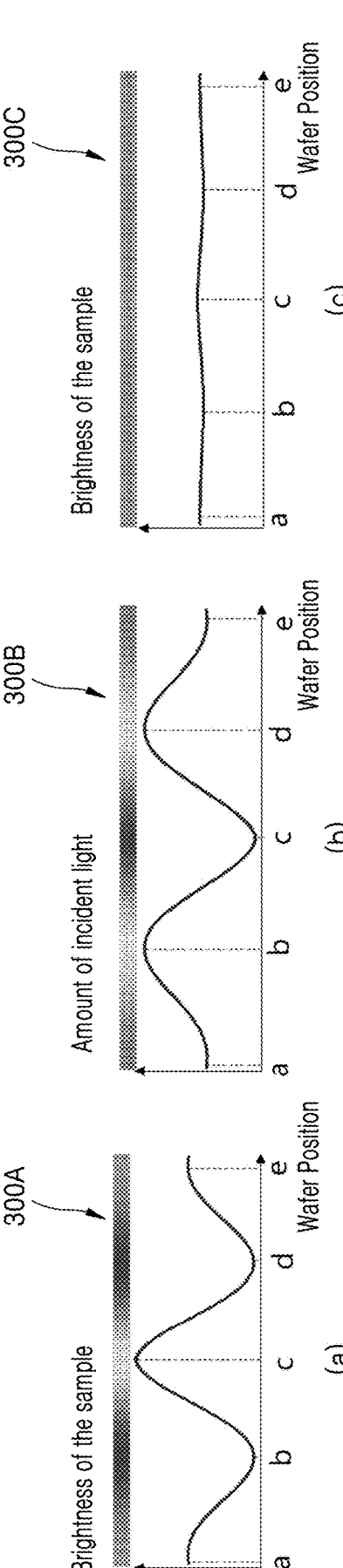
FIG. 13 is a graph showing the effects of the defect inspection device according to an embodiment.

FIG. 13 is a graph showing the effects of the defect inspection device according to an embodiment.

In (a) of FIG. 13, the X axis represents a position from one end to the opposite end of a main surface 12S of a substrate 12 and the Y-axis represents the amount of light (e.g., L2) according to the position on the main surface 12S of the substrate 12 before the amount of light is regulated by a light quantity regulator 120 of a controller 300. A first brightness band 300A is a band that visually shows the amount of light according to the position on the main surface 12S of the substrate 12.

In (b) of FIG. 13, the X axis represents a position from one end to the opposite end of the main surface 12S of the substrate 12 and the Y axis represents the amount of light (e.g., L1) that is regulated by the light quantity regulator 120 and then projected. A second brightness band 300B is a band that visually shows the amount of light which is regulated by the light quantity regulator 120 and then projected.

In (c) of FIG. 13, an X axis represents a position from one end to the opposite end of the main surface 12S of the substrate 12 and the Y-axis represents the amount of light (e.g., L2) according to the position on the main surface 12S of the substrate 12 after the amount of light is regulated by the light quantity regulator 120. A third brightness band 300C is a band that visually shows the amount of light according to the position on the main surface 12S of the substrate 12.

As illustrated in (a) of FIG. 13, the amount of light was the lowest at points b and d and the amount of light was the highest at point c before the amount of light was regulated by the light quantity regulator 120 of the controller 300. Therefore, as illustrated in (b) of FIG. 13, the light quantity regulator 120 regulates the amount of light projected to the points b and d to be the highest and regulates the amount of light projected to the point c to be the lowest. Accordingly, as illustrated in (c) of FIG. 13, the amounts of light reflected over all regions of the substrate 12 may be made uniform.

FIG. 14 is a view showing the effects of the defect inspection device and the defect inspection method according to an embodiment.

Points a to e representing regions of the substrate shown in FIG. 14 may respectively correspond to the points a to e illustrated in FIG. 13. (d) of FIG. 14 shows the amount of light according to the position on the substrate 12 before the amount of light is regulated by the light quantity regulator 120 and (e) of FIG. 14 shows the amount of light according to the position on the substrate 12 after the amount of light is regulated by the light quantity regulator 120. Specifically, (d) of FIG. 14 shows an image of the light reflected from the substrate 12, which is captured by the image sensor 280 of FIG. 1 before the amount of light is regulated by the light quantity regulator 120. Also, (e) of FIG. 14 shows an image of the light reflected from the substrate 12, which is captured by the image sensor 280 of FIG. 1 after the amount of light is regulated by the light quantity regulator 120. Referring to (d) of FIG. 14, the amounts of light detected according to the positions on the substrate 12 are different from each other before the amounts of light are regulated by the light quantity regulator 120. Specifically, the amount of light was the lowest at points b and d, and the amount of light was the highest at point c. Subsequently, as illustrated in (e) of FIG. 14, the amounts of light reflected over all regions of the substrate 12 may be made uniform after the amounts of light are regulated by the light quantity regulator 120.

While aspects of the inventive concept have been particularly shown and described with reference to embodiments thereof, it will be understood that various changes in form and details may be made therein without departing from the spirit and scope of the following claims.

What is claimed is:

1. A defect inspection device comprising:
a stage configured on which to mount a substrate;
an objective lens disposed above the stage to project light onto the substrate;
a light source configured to emit light onto a main surface of the substrate via the objective lens;
an image sensor configured to detect an image of the substrate;
a light quantity measurement sensor disposed between the stage and the image sensor, the light quantity measurement sensor configured to measure an amount of the light that is reflected from a first region of the main surface of the substrate;
a light quantity regulator located between the light source and the objective lens and configured to regulate an amount of the light that is emitted from the light source onto the main surface of the substrate; and
a controller configured to control the light quantity regulator so that the light quantity regulator regulates the amount of the light emitted to the first region of the main surface of the substrate on the basis of information about the amount of the light reflected from the first region measured by the light quantity measurement sensor,
wherein the light quantity measurement sensor is configured to measure an amount of light reflected from an $n^{th}$ region adjacent to an $n-1^{th}$ region of the main surface of the substrate after the light quantity regulator regulates the amount of the light emitted to the first region on the basis of the information about the amount of the light reflected from the first region measured by the light quantity measurement sensor, and
where n is an integer of 2 or more.

2. The defect inspection device of claim 1, wherein the controller is configured to control the light quantity regulator so that the amount of the light emitted to the first region decreases when the amount of the light reflected from the first region measured by the light quantity measurement sensor is greater than a reference amount of light that is preset.

3. The defect inspection device of claim 2, wherein a degree of the amount of light to be reduced increases as a difference between the reference amount of light and the amount of the light reflected from the first region measured by the light quantity measurement sensor increases.

4. The defect inspection device of claim 1, wherein the controller is configured to control the light quantity regulator so that the amount of the light emitted to the first region increases when the amount of the light reflected from the first region measured by the light quantity measurement sensor is less than a reference amount of light that is preset.

5. The defect inspection device of claim 4, wherein the controller is configured such that a degree of an amount of light to be raised increases as a difference between the reference amount of light and the amount of the light reflected from the first region measured by the light quantity measurement sensor increases.

6. The defect inspection device of claim 1, wherein the controller is configured to control the light quantity regulator so that the light quantity regulator regulates the amount of the light emitted to the $n^{th}$ region on the basis of information about the amount of the light reflected from the $n^{th}$ region measured by the light quantity measurement sensor.

7. The defect inspection device of claim 1, wherein the light quantity regulator comprises a digital micromirror device (DMD) or a liquid crystal filter.

8. The defect inspection device of claim 1, wherein the light quantity regulator is configured to reflect at least a portion of the light, which is emitted from the light source, to thereby regulate the amount of the light emitted onto the main surface of the substrate.

9. The defect inspection device of claim 1, wherein a maximum width of the first region is about 10 micrometers to about 10 millimeters.

10. A defect inspection method comprising:
emitting, by a light source, light onto a substrate disposed on a stage via an objective lens;
measuring, by a light quantity measurement sensor, an amount of the light reflected from a first region of a main surface of the substrate;
receiving, by a controller, information about the amount of the light measured by the light quantity measurement sensor;
calculating, by the controller, a difference value between the amount of the light that is measured by the light quantity measurement sensor and a reference amount of light that is preset and then transmitting the difference value to a light quantity regulator;
correcting, by the light quantity regulator, an amount of light emitted to the first region based on the difference value;
after the correcting of the amount of the light in the first region based on the difference value by the light quantity regulator, measuring, by the light quantity measurement sensor, an amount of light that is reflected from an $n^{th}$ region adjacent to an $n-1^{th}$ region of the main surface of the substrate;
receiving, by the controller, information about the amount of the light measured by the light quantity measurement sensor;
calculating, by the controller, a difference value between the amount of the light in the $n^{th}$ region that is measured by the light quantity measurement sensor and the reference amount of light that is preset and then transmitting the difference value to the light quantity regulator; and
correcting, by the light quantity regulator, an amount of light emitted to the $n^{th}$ region based on the difference value,
where n is an integer of 2 or more.

11. The defect inspection method of claim 10, wherein the correcting of the amount of the light in the first region by the light quantity regulator comprises increasing the amount of the light emitted to the first region as much as the difference value when the amount of the light reflected from the first region measured by the light quantity measurement sensor is less than the reference amount of light.

12. The defect inspection method of claim 10, wherein the correcting of the amount of the light in the first region by the light quantity regulator comprises decreasing the amount of the light emitted to the first region as much as the difference value when the amount of the light reflected from the first region measured by the light quantity measurement sensor is greater than the reference amount of light.

13. The defect inspection method of claim 10, wherein the light quantity regulator is located between the light source and the objective lens.

14. The defect inspection method of claim 10, wherein the light quantity regulator comprises a digital micromirror device (DMD) or a liquid crystal filter.

15. The defect inspection method of claim 10, wherein the light quantity regulator reflects at least a portion of the light, which is emitted from the light source, to thereby regulate the amount of the light emitted onto the main surface of the substrate.

16. The defect inspection method of claim 10, wherein a maximum width of the first region is about 10 micrometers to about 10 millimeters.

17. A defect inspection device comprising:
a stage configured on which to mount a substrate;
an objective lens disposed above the stage to project light onto the substrate;
a light source configured to provide light onto a main surface of the substrate via the objective lens;
a light quantity measurement sensor disposed above the stage and configured to measure an amount of the light that is reflected from a first region of the main surface of the substrate;
a light quantity regulator located between the light source and the objective lens and configured to regulate an amount of the light that is emitted from the light source onto the main surface of the substrate;
a controller configured to control the light quantity regulator so that the light quantity regulator regulates the amount of the light provided to the first region on a basis of information about the amount of the light reflected from the first region measured by the light quantity measurement sensor; and
an image sensor configured to capture an image of the light reflected from the main surface of the substrate,
wherein the light quantity measurement sensor is disposed between the stage and the image sensor,
wherein the controller is configured to control the light quantity regulator so that the amount of the light emitted to the first region decreases when the amount of the light in the first region measured by the light quantity measurement sensor is greater than a reference amount of light that is preset and the amount of the light emitted to the first region increases when the amount of the light in first region measured by the light quantity measurement sensor is less than the reference amount of light that is preset,
wherein the light quantity measurement sensor is configured to measure an amount of light reflected from an $n^{th}$ region adjacent to an $n{-}1^{th}$ region of the main surface of the substrate after the light quantity regulator regulates the amount of the light emitted to the first region on the basis of the information about the amount of the light reflected from the first region measured by the light quantity measurement sensor, and
where n is an integer of 2 or more.

18. The defect inspection device of claim 17, wherein the defect inspection device is configured such that a degree of an amount of light to be reduced or raised increases as a difference between the reference amount of light and the amount of the light in the first region measured by the light quantity measurement sensor increases.

19. The defect inspection device of claim 17, wherein the light quantity measurement sensor comprises one of a photoelectric tube, a photomultiplier tube, a photoconductive sensor, a PN photodiode, a PIN diode, an avalanche photodiode, a phototransistor, a PSD, an ion chamber, and a proportional counter.

\* \* \* \* \*